(12) United States Patent
Ryu et al.

(10) Patent No.: US 11,811,464 B2
(45) Date of Patent: Nov. 7, 2023

(54) PROBABILISTIC ESTIMATION REPORT

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 17/366,772

(22) Filed: Jul. 2, 2021

(65) Prior Publication Data

US 2023/0006748 A1     Jan. 5, 2023

(51) Int. Cl.
    *H04B 17/391*     (2015.01)
    *H04B 17/318*     (2015.01)
    *H04B 17/336*     (2015.01)
    *H04B 7/0456*     (2017.01)

(52) U.S. Cl.
    CPC ....... *H04B 17/3913* (2015.01); *H04B 7/0456* (2013.01); *H04B 17/318* (2015.01); *H04B 17/336* (2015.01)

(58) Field of Classification Search
    CPC .............. H04B 17/3913; H04B 17/318; H04B 17/336; H04B 7/0456
See application file for complete search history.

(56) References Cited

U.S. PATENT DOCUMENTS

| | | |
|---|---|---|
| 2004/0203475 A1 | 10/2004 | Gaal |
| 2014/0192917 A1 | 7/2014 | Nam et al. |
| 2015/0071368 A1 | 3/2015 | Lau et al. |
| 2017/0079596 A1* | 3/2017 | Teixeira ................. A61B 5/029 |
| 2017/0237529 A1 | 8/2017 | Eriksson et al. |
| 2019/0182614 A1 | 6/2019 | Monogioudis et al. |
| 2020/0252142 A1 | 8/2020 | Bedekar |
| 2020/0382192 A1* | 12/2020 | Sethuraman ......... H04B 7/0617 |

FOREIGN PATENT DOCUMENTS

| | | |
|---|---|---|
| EP | 2636242 A1 | 9/2013 |
| WO | 2017184190 A1 | 10/2017 |

OTHER PUBLICATIONS

International Search Report and Written Opinion—PCT/US2022/073044—ISA/EPO—dated Oct. 12, 2022.

(Continued)

*Primary Examiner* — Duc C Ho
(74) *Attorney, Agent, or Firm* — Patterson + Sheridan, LLP

(57) ABSTRACT

Certain aspects of the present disclosure provide techniques for providing a probabilistic feedback parameter. One example method for wireless communication may be performed by a first wireless node. The method generally includes generating a feedback message indicating a probabilistic estimate comprising a plurality of feedback parameter values and a plurality of value probabilities, wherein each value probability is associated with one feedback parameter value of the plurality of feedback parameter values, and transmitting the feedback message to a second wireless node.

30 Claims, 12 Drawing Sheets

(56) References Cited

OTHER PUBLICATIONS

Mehdi Bennis et al., "Ultra-Reliable and Low-Latency Wireless Communication: Tail, Risk and Scale", ARXIV.org, Cornell University Library, 201 Olin Library Cornell University Ithaca, NY 14853, Jan. 4, 2018, 26 Pages, XP080850427, Section VII.

Nokia, et al., "CSI Feedback Enhancements for URLLC/IIoT Use Cases", 3GPP TSG RAN WG1 Meeting #102-e, R1-2005552, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, 13 Pages, XP051914988, Section 3, Section Appendix B, Figure 5.

Nokia, et al., "CSI Feedback Enhancements for URLLC/IIoT Use Cases (Revised)", 3GPP TSG RAN WG1 #105-e, R1-2106003, 3rd Generation Partnership Project, Mobile Competence Centre, 650, Route Des Lucioles, F-06921 Sophia-Antipolis Cedex, France vol. RAN WG1, No. e-Meeting, May 10, 2021-May 27, 2021, May 18, 2021, 19 Pages, XP052012340, Title, Section Appendix B; Figures B-2, B-3.

Panasonic: "MCS Report in Mode 1 Resource Allocation", 3GPP TSG RAN WG1 Meeting #77, R1-142188, 3rd Generation Partnership Project, Mobile Competence Centre, 650, Route Des Lucioles, F-06921 Sophia-Antipolis Cedex, France vol. RAN WG1, No. Seoul, Korea, May 19, 2014-May 23, 2014, May 9, 2014, 2 Pages, XP050814319, Section 2.

\* cited by examiner

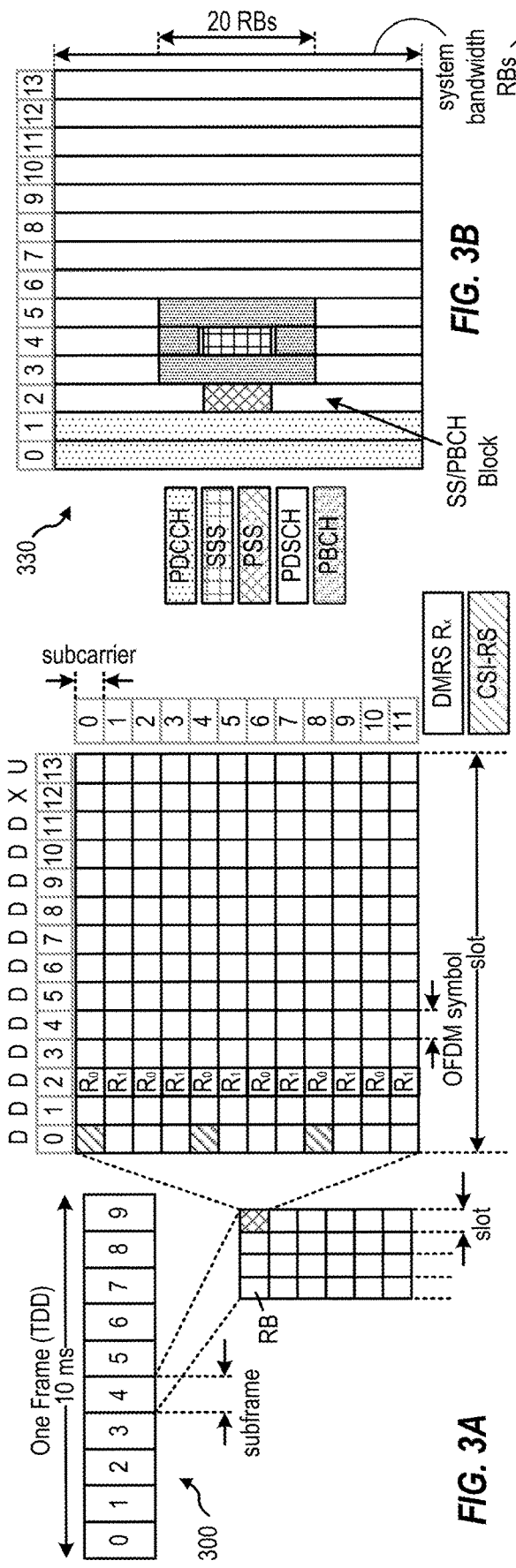
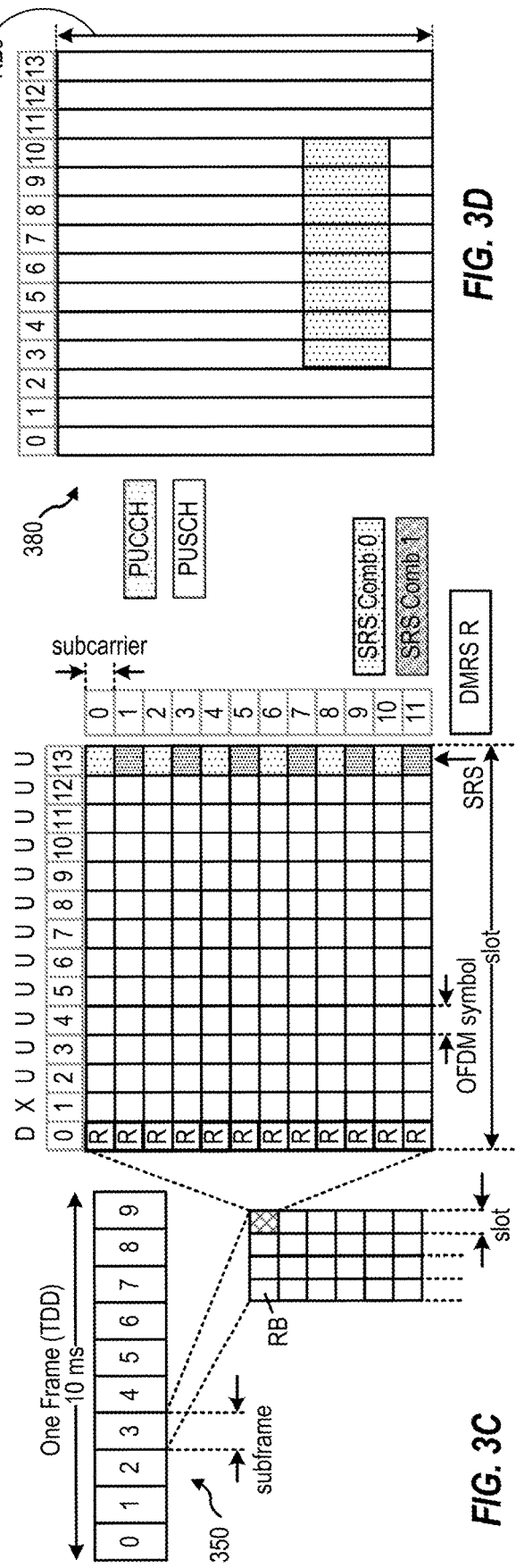

| BS DL Beam Index | UE Beam Index | Estimate Information |
|---|---|---|
| 1 | 1 | SINR estimate: mean = 10dB, variance = 5dB, confidence = 0.9, validity duration = 10ms |
| 1 | 2 | Signal estimate: mean=-70dBm, variance = 5dBm, confidence = 0.99, validity duration = 100ms<br>Interference estimate: mean=-80dBm, variance = 10dBm, PDF type = uniform, validity duration = 20ms |
| 2 | 1 | SINR estimate 1: mean = 10dB, variance = 7dB, confidence = 0.7, validity duration = 10ms<br>SINR estimate 2: mean = 11dB, variance = 5dB, confidence = 0.9, validity duration = 5ms |

FIG. 7

PROBABILISTIC ESTIMATION REPORT

INTRODUCTION

Aspects of the present disclosure relate to wireless communications, and more particularly, to techniques for providing a probabilistic feedback parameter.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a first wireless node. The method generally includes: generating a feedback message indicating a probabilistic estimate comprising a plurality of feedback parameter values and a plurality of value probabilities, wherein each value probability is associated with one feedback parameter value of the plurality of feedback parameter values; and transmitting the feedback message to a second wireless node.

One aspect provides a method for wireless communication by a first wireless node. The method generally includes receiving, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and configuring a communication for the second wireless node based on the feedback message.

One aspect provides an apparatus for wireless communication by a first wireless node. The apparatus generally includes a memory comprising executable instructions; and one or more processors configured to execute the executable instructions and cause the apparatus to generate a feedback message indicating a probabilistic estimate comprising a plurality of feedback parameter values and a plurality of value probabilities, wherein each value probability is associated with one feedback parameter value of the plurality of feedback parameter values; and transmit the feedback message to a second wireless node.

One aspect provides an apparatus for wireless communication by a first wireless node. The apparatus generally includes a memory comprising executable instructions; and one or more processors configured to execute the executable instructions and cause the apparatus to receive, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and configure a communication for the second wireless node based on the feedback message.

One aspects provides a non-transitory computer-readable medium comprising executable instructions that, when executed by one or more processors of a first wireless node, cause the first wireless node to generate a feedback message indicating a probabilistic estimate comprising a plurality of feedback parameter values and a plurality of value probabilities, wherein each value probability is associated with one feedback parameter value of the plurality of feedback parameter values; and transmit the feedback message to a second wireless node.

One aspects provides a non-transitory computer-readable medium comprising executable instructions that, when executed by one or more processors of a first wireless node, cause the first wireless node to receive, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and configure a communication for the second wireless node based on the feedback message.

One aspect provides an apparatus for wireless communication by a first wireless node. The apparatus generally includes: means for generating a feedback message indicating a probabilistic estimate comprising a plurality of feedback parameter values and a plurality of value probabilities, wherein each value probability is associated with one feedback parameter value of the plurality of feedback parameter values; and means for transmitting the feedback message to a second wireless node.

One aspect provides an apparatus for wireless communication by a first wireless node. The apparatus generally includes: means for receiving, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and means for configuring a communication for the second wireless node based on the feedback message.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 7 is a table illustrating estimate information for various beam pairs, in accordance with certain aspects of the present disclosure.

DETAILED DESCRIPTION

Aspects of the present disclosure provide apparatuses, methods, processing systems, and computer-readable mediums for providing a probabilistic feedback parameter. To facilitate configuration of communication on a channel, a user equipment (UE) may provide various feedback parameters, such as a signal-to-interference-plus-noise ratio (SINR). Typically, the UE provides a single value of a feedback parameter representing an instantaneous measurement of the parameter or an average of measurements made over a band. A single value indication of a feedback parameter may not provide sufficient information regarding channel quality because channel quality varies within a range of possible values. For example, the feedback parameter may vary due to changing communication activities of neighboring base stations. Therefore, what is needed are techniques for providing more detailed information regarding a measured feedback parameter.

Certain aspects of the present disclosure are directed to providing detailed information regarding a measured feedback parameter in the form of a probabilistic feedback parameter. For example, an estimate report may be generated to indicate a probability distribution function associated with a feedback parameter such as an SINR. The probability distribution function may indicate values of the feedback parameter and associated value probabilities. Indicating a probability distribution function for a feedback parameter provides various processing options. For example, a base station may receive and input the probability distribution function to a machine learning model to determine a configuration for communication or perform UE selection. The probability distribution function from a UE may also be used to facilitate coordination with neighboring base stations to adjust transmit power and modify a channel quality environment of the UE. The probability distribution function provides more detailed information about the measured feedback parameter compared to conventional methods, allowing for communications to be configured more efficiently and based on a more accurate channel quality assessment. In-turn, the reliability and speed (e.g., data rate) of communications may be improved based on the more detailed information about the measured feedback parameter, leading to more efficient use of the medium.

Introduction to Wireless Communication Networks

Figure 1:
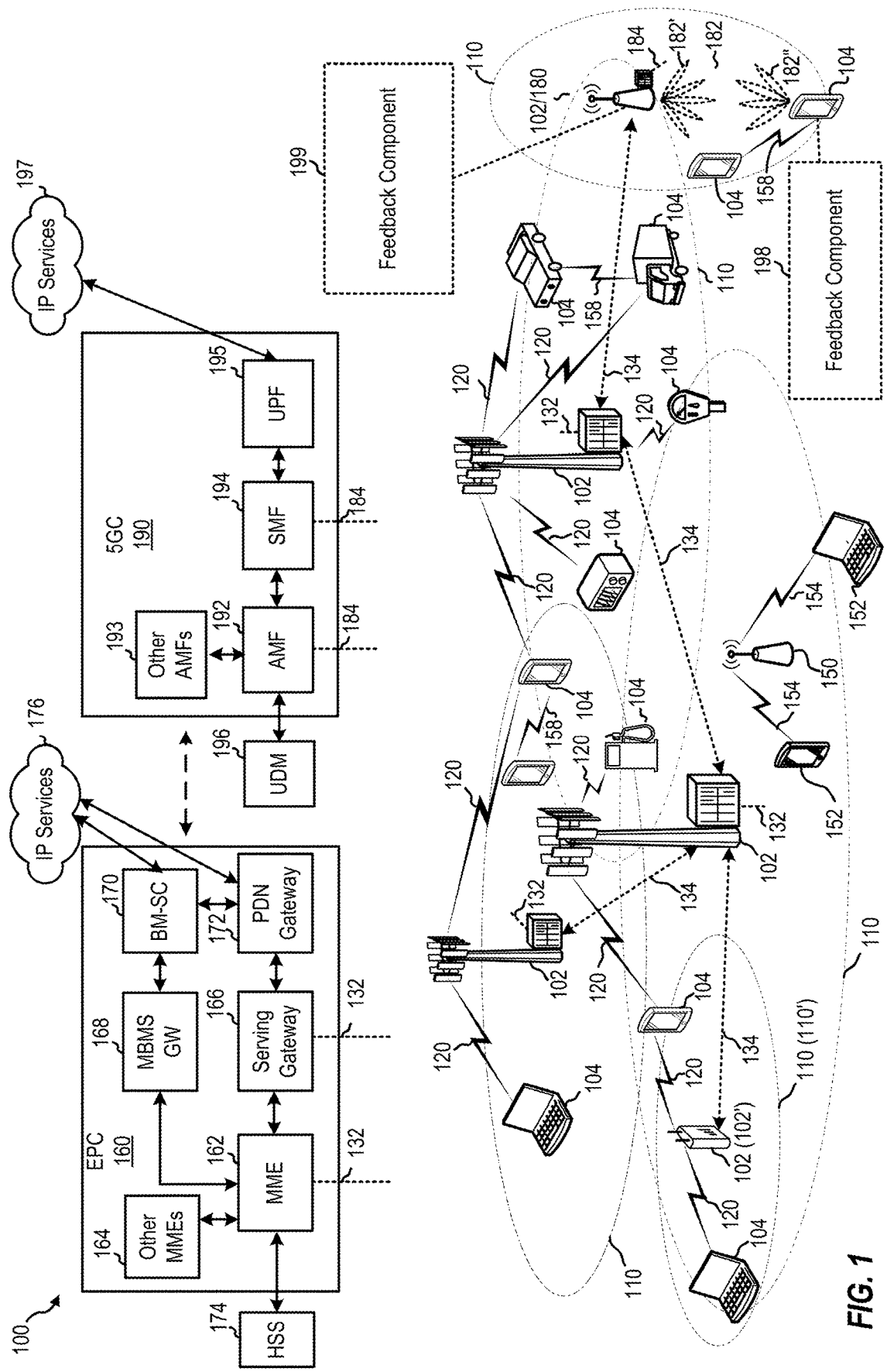
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a feedback component 199, which may be configured to receive a probabilistic feedback parameter. Wireless network 100 further includes a feedback component 198, which may be used configured to provide a probabilistic feedback parameter.

Figure 2:
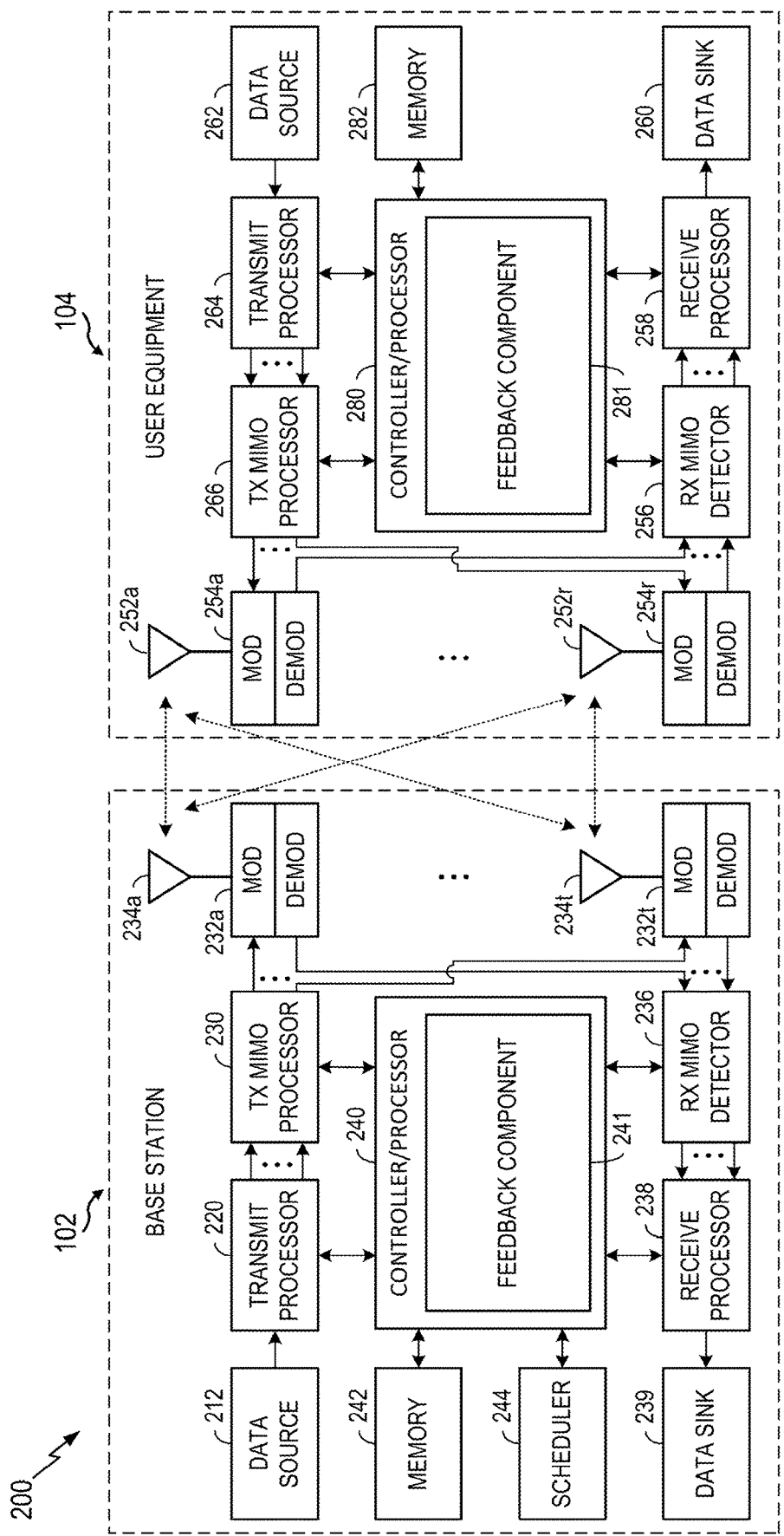
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a feedback component 241, which may be representative of a feedback component 199 of FIG. 1. Notably, while depicted as an aspect of controller/processor 240, a feedback component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes a feedback component 281, which may be representative of a feedback component 198 of FIG. 1. Notably, while depicted as an aspect of controller/processor 280, a feedback component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Introduction to Inter-Cell Interference

Figure 4:
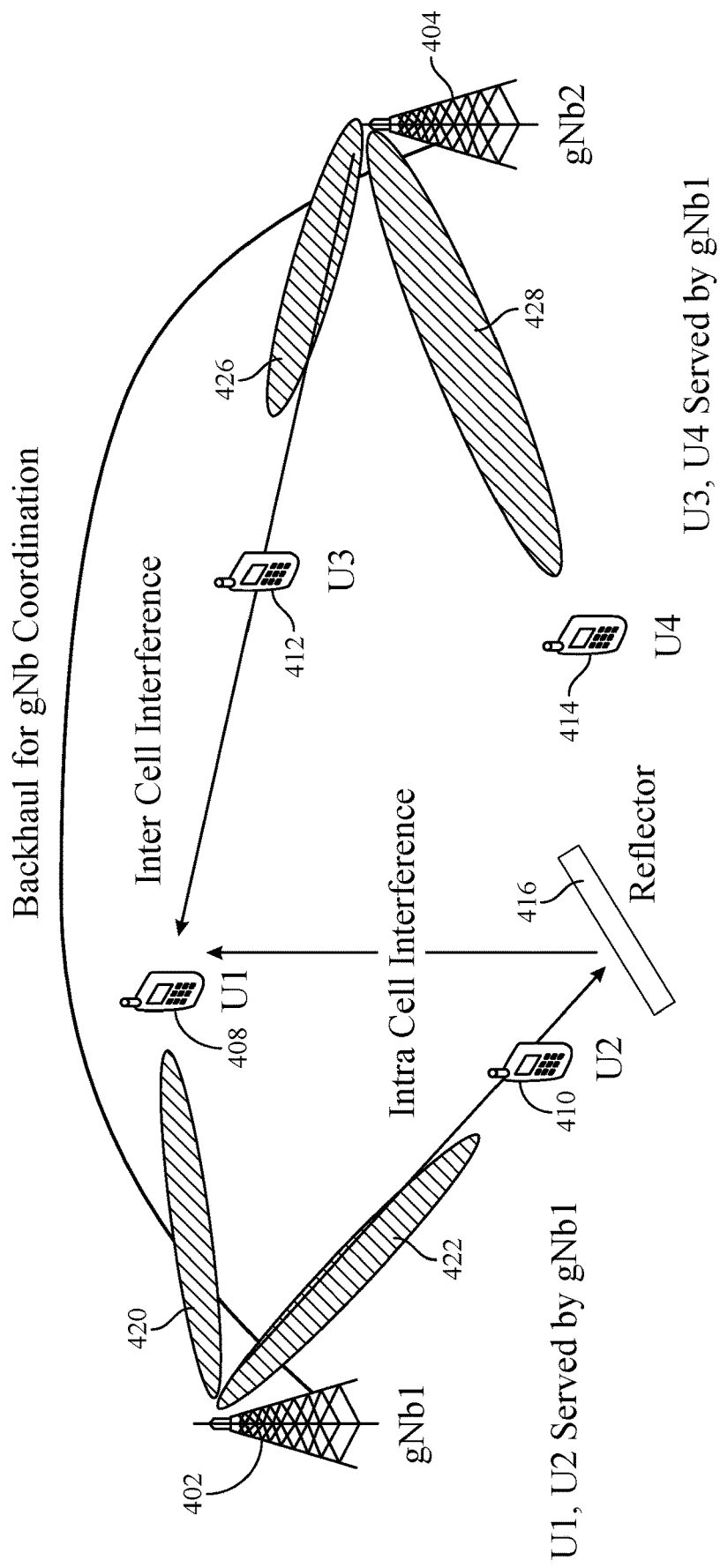
FIG. 4 illustrates a wireless communications system showing inter cell interference.

FIG. 4 illustrates a wireless communications system showing inter-cell interference. As illustrated, the BS 402 may serve UE 408 (labeled U1) and UE 410 (labeled U2). The BS may communicate with UE 408 (labeled U1) using beam 420 and communicate with UE 410 using beam 422. Similarly, BS 404 may serve UE 412 (labeled U3) and UE 414 (labeled U4). BS 404 may communicate with UE 412 using beam 426 and communicate with UE 414 using beam 428, as shown. BS 402 and BS 404 may be part of different cells and communications by BS 402 and BS 404 may cause inter-cell interference. For example, the direction of beam 426 may face both UE 412 and UE 408, and thus, communication with UE 412 may cause interference with UE 408.

As another example, signaling using beam 422 may reflect off an object 416 and cause interference with UE 408, causing intra-cell interference.

Downlink (DL) performance for the BSs may depend on a signal-to-interference-plus-noise ratio (SINR). The inter-cell interference described with respect to FIG. 4 may reduce SINR, degrading DL performance. In other words, signal power depends on the channel between a UE (e.g., UE 408) and the serving BS (e.g., BS 402). Signal power can vary over a range due to changing channel conditions and UE movement, to name just a few causes. SINR measurements may be performed to reduce uncertainty regarding signal strength and range of possible signal strengths.

SINR also takes into account interference. Interference depends on the channel between the UE (e.g., UE 408) and neighboring BSs (e.g., BS 404). The amount of interference experienced by a UE may vary over a range. The interference may vary for reasons independent from actions (e.g., active communication) of neighboring BSs (e.g., BS 404). Interference may also vary depending on the communications of other BSs, as described. Without the UE being aware of active communications by neighboring BSs, instantaneous interference measurements may not be useful since the interference may vary within a range of possible interference values. One technique may be to measure and use an average interference value. However, the measurement of average interference does not help predict DL performance in a slot.

Aspects Related to Providing a Probabilistic Feedback Parameter

Conventionally, a SINR estimate may be taken as a single value. However, as described herein, SINR generally varies over a range based on various dynamic factors. Accordingly, some aspects described herein are directed to reporting SINR as a range and a probability over the range. For example, the SINR may be indicated as a probability distribution function (also referred to herein as a probabilistic estimate). In some aspects, an SINR estimate may be reported as a probabilistic estimate and the probabilistic estimate may be associated with a confidence value. For instance, a probabilistic estimate of SINR may be derived using a high confidence value or a low confidence value, as described in more detail herein.

Figure 5A:
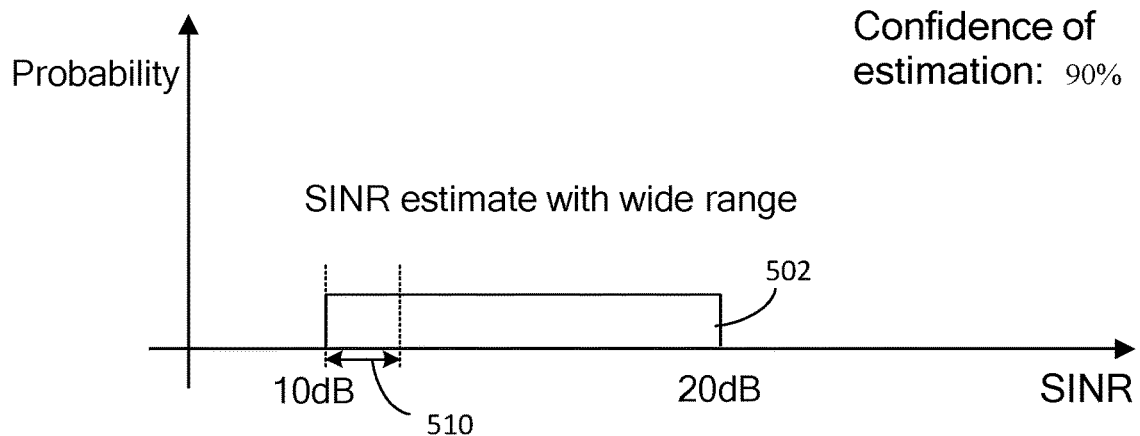
FIGS. 5A and 5B illustrates example probabilistic signal quality estimates, in accordance with certain aspects of the present disclosure.
Figure 5B:
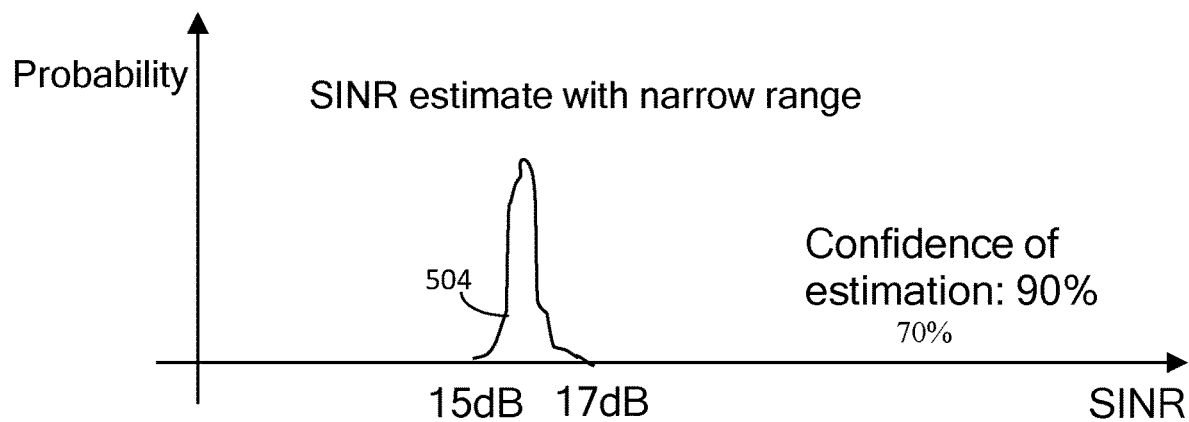

FIGS. 5A and 5B illustrate example probabilistic SINR estimates. As illustrated in FIG. 5A, a probabilistic SINR estimate 502 may have a range from 10 dB to 20 dB. A UE may have a 90% confidence in the probabilistic SINR estimate. Generally, the wider range for a probabilistic estimate, the higher the confidence value may be for the probabilistic estimate. For instance, as shown in FIG. 5B, the probabilistic estimate 504 may have a range between 15 dB and 17 dB and the confidence value associated with the probabilistic estimate may be 70%. An SINR estimate with a narrow range (e.g., having a high peak probability) is more useful to a BS as the number of possible interference values is less, and the BS may choose to use a DL beam corresponding to that SINR estimate. In other words, a UE may provide a probabilistic estimate with a narrower range with a lower confidence value, or provide a probabilistic estimate with a wider range with a higher confidence value. In some aspects, a BS may configure the UE with a confidence value (e.g., a minimum confidence value) to be used for generating the probabilistic estimate. For instance, the BS may indicate to the UE to provide a probabilistic estimate having at least a 70% confidence value.

Figure 6A:
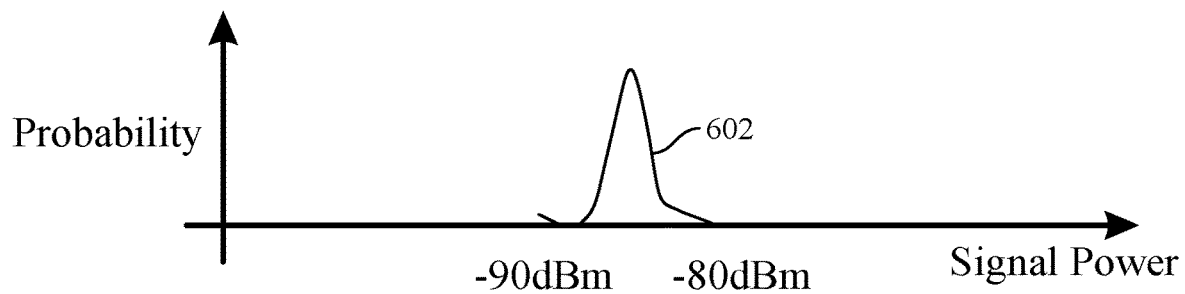
FIGS. 6A, 6B, and 6C illustrate example probabilistic estimates for signal power and interference power, in accordance with certain aspects of the present disclosure.
Figure 6B:
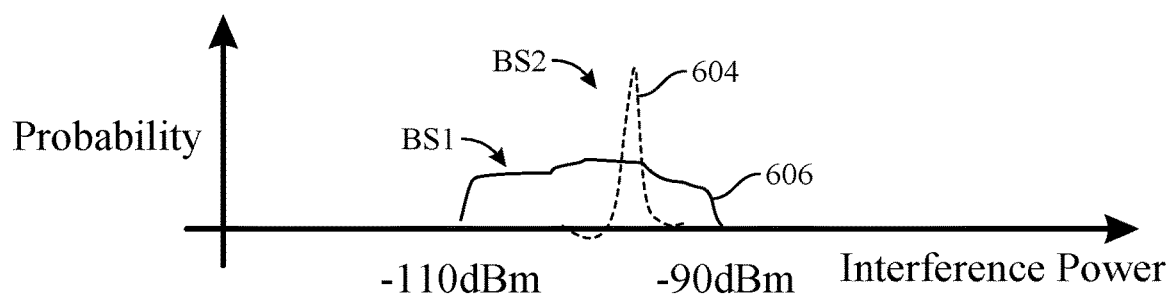

FIGS. 6A and 6B illustrate an example probabilistic estimate 602 for signal power and a probabilistic estimate 604 for interference power. A UE may feedback separate probabilistic estimates for signal power (e.g., signal strength) and interference. In other words, instead of providing a single SINR probabilistic estimate, separate probabilistic estimates 602, 604 may be provided for signal power and interference power separately. A receiver may use the separate probabilistic estimates for signal power and interference power to calculate SINR and configure communications accordingly. Providing separate probabilistic estimates for signal power and interference power provides more information to the BS since the BS can determine the signal power and interference power separately, as opposed to a ratio of signal power and interference power. In some aspects, an interference power estimate may identify the source BS of interference. For example, the probabilistic estimate 604 may indicate the interference from a first BS and the probabilistic estimate 606 may indicate the interference from a second BS.

Figure 6C:
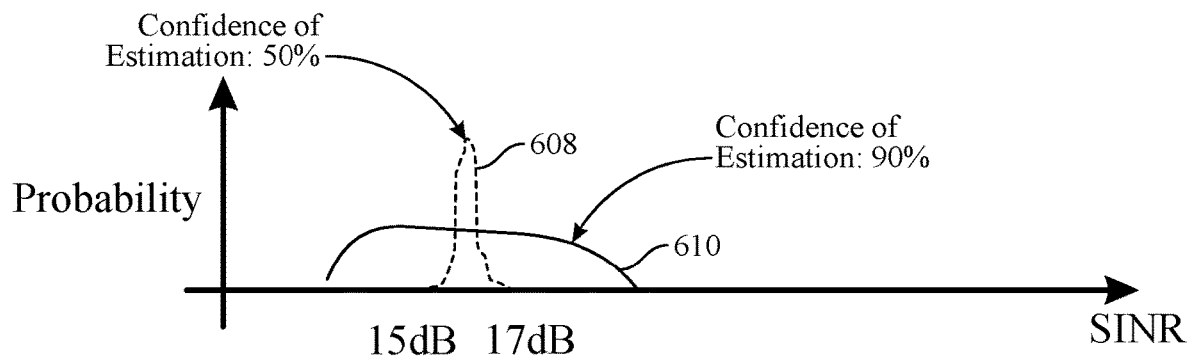

FIG. 6C illustrates example probabilistic estimates associated with different confidence values. In other words, a UE may feedback probabilistic estimates for different confidence values. Probabilistic estimate 608 having a narrower range may be associated with a lower confidence value of 50% and the probabilistic estimate 610 having a wider range may be associated with a higher confidence value of 90%, as shown. To derive a high confidence (e.g., 90%) distribution function, a UE may observe the medium for a longer time (e.g., resulting in collection of more samples) as compared to deriving a low confidence (e.g., 50%) distribution function.

In some aspects, a UE may send one or more probabilistic downlink (DL) SINR reports to the BS corresponding to multiple transmit (Tx)-receive (Rx) beam pairs. As described with respect to FIGS. 5A, 5B, 6A, 6B, and 6C, the one or more SINR reports may contain combinations of probabilistic SINR estimates, probabilistic signal power estimates, probabilistic interference estimates, and confidence values, in addition to (or instead of) instantaneous/averaged measurements of SINR.

FIG. 7 is a table 700 illustrating estimate information for various beam pairs. An estimate report may include any combination of a probabilistic SINR estimate, probabilistic signal power estimate, probabilistic interference estimate, and a confidence value. In some aspects, the estimate report may also include an indication of an instantaneous or averaged measurement of SINR (e.g., an average SINR measured across a given bandwidth).

For example, for a BS DL beam index 1 and UE beam index 1, an SINR estimate may be indicated having a mean interval of [10 dB, 12 dB], standard deviation of [5 dB, 6 dB], a confidence value of 0.9 (90%), validity duration of 10 ms, and an indication of the time and frequency resources of measurements. The validity duration indicates how long the indicated SINR estimate will be valid from when the SINR estimate is indicated. The indication of the time and frequency resources of measurements indicates the time and frequency resources in which the measurements were made, and on which the probabilistic estimates were based. For example, calculating SINR mean interval of confidence value of 0.9 can be based on the SINR measurements made in the indicated time and frequency resources. The BS DL beam index may correspond to an index of a synchronization signal block (SSB) transmission from the BS to the UE, and the UE beam index may correspond to an index associated with a sounding reference signal (SRS) transmission from the UE to the BS. For example, the UE may receive an SSB associated with BS DL beam index 1 while transmitting an SRS associated with UE beam index 1. The UE may then measure SINR based on the SSB and indicate the SINR as the estimate for the BS DL beam index 1 and UE beam index 1.

As shown, for BS DL beam index 1 and UE beam index 2, an SINR estimate may be indicated using separate signal and interference estimates. As shown, a type of the probability distribution function (labeled as "PDF" in FIG. 7) associated with the estimate may also be indicated. For instance, the probability distribution function may be a uniform distribution function. Other example types of probability distribution function types may include normal (Gaussian) distribution, mixture Gaussian distribution, log normal distribution, or triangular distribution, to name a few.

Figure 8:
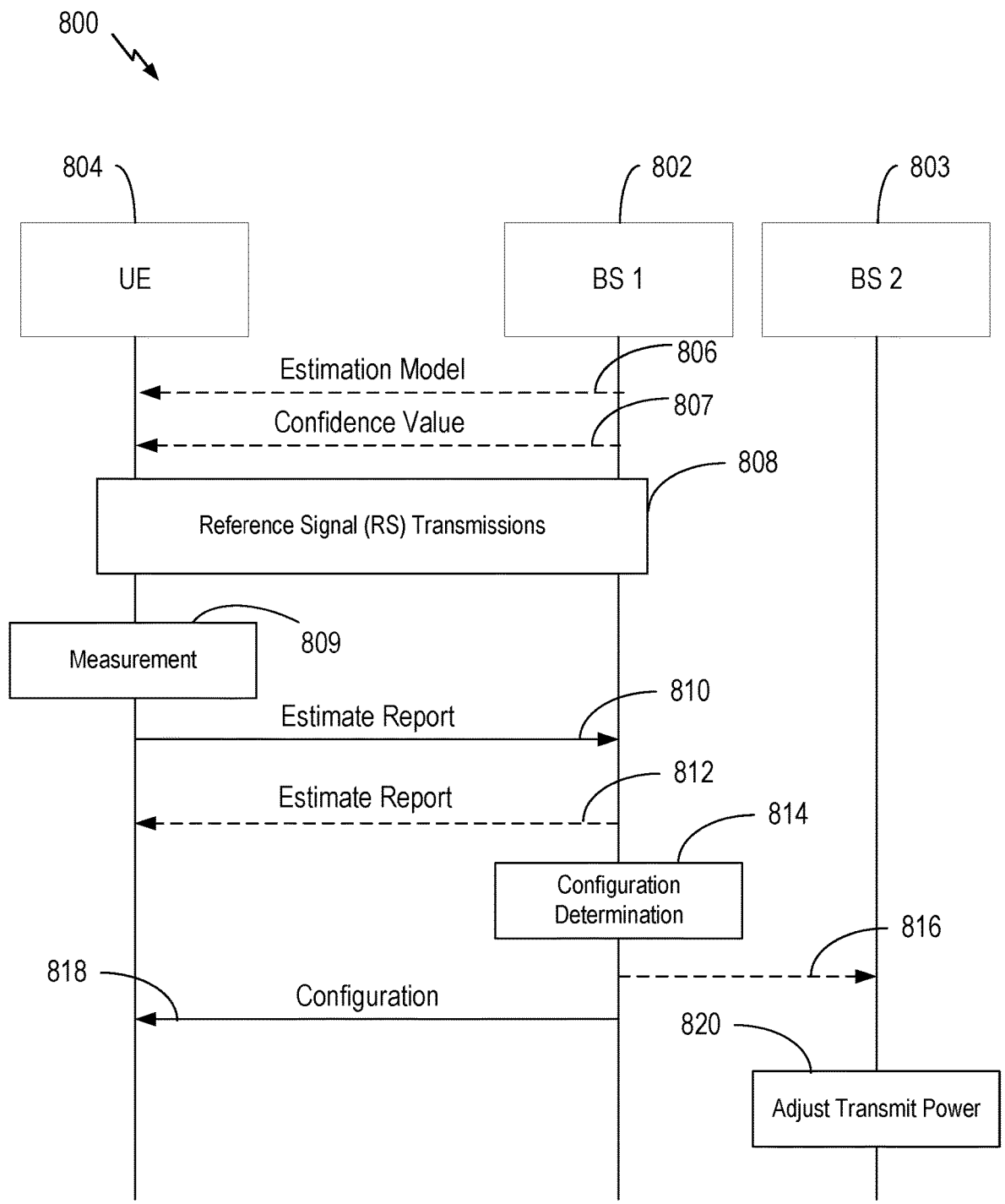
FIG. 8 is a call flow diagram illustrating example operations for estimate reporting, in accordance with certain aspects of the present disclosure.

FIG. 8 is a call flow diagram illustrating example operations 800 for estimate reporting. As shown, a UE 804 may perform one or more measurements at block 809 based on reference signal (RS) transmissions 808. The UE may then transmit an estimate report 810, as described herein with respect to FIGS. 5A, 5B, 6A, 6B, 6C, and 7. The estimate report 810 may be transmitted using radio resource control (RRC) signaling, medium access control (MAC) control element (CE), or uplink control information (e.g., on a physical uplink control channel (PUCCH)). In some cases, the UE 804 may receive an indication of a confidence value 807 to be used. The estimate report 810 may indicate a probability distribution function having the confidence value 807 (e.g., may indicate a mean interval and standard deviation interval of the probability distribution function, as well as other parameters such as confidence value, validity duration, time and freq. resources of measurements, and probability distribution function type).

Based on the estimate report, the BS 802 may determine a configuration for communication at block 814. For example, the BS 802 may select, based on the estimate report 810, a DL beam to be used for communication with the UE. In some cases, the BS 802 may select a DL beam having a narrower SINR estimate range than another DL beam having a wider SINR range even if the other DL beam is associated with a higher instantaneous SINR, since the narrower SINR estimate range provides fewer possible values of SINR.

In some aspects, the BS 802 may select a modulation and coding scheme (MCS) based on the estimate report 810. For example, the BS may select an MCS that is compatible with a lower end of an SINR estimate to improve block error rate (BLER). For instance, referring back to FIG. 5A, the BS may select an MCS associated with a lower end 510 of the SINR estimate 502.

In some aspects, the BS 802 may perform UE selection based on the estimate report. For example, the BS 802 may use a probabilistic SINR estimate to select a UE to be configured for communication. In some aspects, UEs with narrower SINR estimate ranges may be given additional priority or preference in UE selection since the channel conditions of the UEs with narrower SINR estimate ranges are more deterministic.

In some aspects, the BS 802 may coordinate with one or more neighboring BSs (e.g. BS 803) to adjust (increase or decrease) transmit power in order to shift (e.g., to lower interference levels), or decrease an interference estimate range. The BS 803 may adjust transmit power at block 820 accordingly. As an example, the UE 804 may report an interference estimate and the report may indicate that the BS 803 is a cause of the interference. The BS 802 may determine to send a message 816 to BS 803 requesting the BS 803 reduce transmit power in an attempt to reduce interference to UE 804. In some aspect, the BS 802 may coordinate with one or more neighboring BSs (e.g., BS 803) to transmit a RS to allow a UE to measure and identify the source of the inter-cell interference. For example, from the probabilistic estimate report from a UE, the BS 802 may determine that the inter-cell interference is high and request one or more neighboring BSs to transmit an inter-cell interference measurement RS with certain properties. For example, the BS 802 may request the neighboring BSs to transmit an inter-cell interference RS in a certain time and frequency resource and scrambled with some scrambling sequences. The BS 802 may then schedule the UE to measure inter-cell interference based on the inter-cell interference RS transmitted by the neighboring BS and identify the source of inter-cell interference based on the UE receiving the inter-cell interference RS scrambled with the scrambling sequence from one or more of the neighboring BSs.

In some aspects, determining the configuration at block 814 may involve inputting the estimate report (e.g., probabilistic SINR estimate(s)) into a machine learning model. For example, a machine learning model may be trained to perform the configuration determination as described herein. Based on probabilistic estimates from UEs from different UEs, the machine learning model may perform UE selection and/or resource allocation that facilitates efficient communication between the BS and the UEs. As shown, after determining the configuration at block 814, the BS 802 may transmit a configuration 818 to the UE 804.

In some aspects, the network provides the UE a prediction or estimation module that the UE can use to generate the estimate report 810. For example, as shown in FIG. 8, the BS 802 may provide an estimation model 806 to the UE 804 to be used for generating the estimate report 810. The estimation model may be a machine learning model, such as a neural network model in some aspects. The UE may input various parameters into the estimation model to generate the estimate report 810. For example, the UE may input the serving BS ID (e.g., ID of BS 802), UE location, and a connection parameter (e.g., beam indices such as UE beam index or BS beam index, UL transmit power, pathloss estimate) to the network. Various UE internal parameter may also be input to the estimation model, such as the number of UE panels, panel orientation, number of antennas, characteristics of beams (e.g., beam width or side lobe width), or any combination thereof.

The UE may also input RS measurements, such as measurements on channel state information (CSI)-RS (e.g., non-zero power (NZP) or zero-power (ZP) CSI-RS), SSB, demodulation reference signal (DMRS), phase tracking RS (PTRS), positioning RS, SRS, CSI-interference measurement (CSI-IM), or cross-link interference (CLI)-SRS, or null tone DMRS. The setup of RS for measurements may depend on UE internal parameters. For example, the network (e.g., BS 802) may request that the UE send the UE internal parameters to be used for generating the estimate report 810. The UE may then send the UE internal parameters to the network, and the network may configure transmission of suitable RSs to facilitate measurements by the UE to generate the internal parameters. An example UE internal parameter may include the quantity of panels that the UE can activate simultaneously. The BS may set up a number of CSI-RS transmissions in the same time and frequency resources for the UE to receive on all UE panels at the same time. This way, the UE can estimate SINR on all panels simultaneously.

In some aspects, the UE may have an estimation model, and use reference signal measurements for prediction. In other words, instead of the BS providing the estimation model to the UE, the UE may be preconfigured with an estimation model to be used to generate the estimate report 810. RS transmission may be set up such that measurements are compatible with the estimation model. For example, the UE may request that the BS set up an RS transmission for compatibility with the configured estimation model. The UE may request a specific RS type, periodicity, transmit power, number of RS transmissions, or any combination thereof.

While some examples provided herein have been described with respect to SINR (e.g., providing a probabilistic SINR report) to facilitate understanding, the aspects described herein are applicable to any suitable parameter. For example, instead of a probabilistic SINR report (or in addition to the probabilistic SINR report), the UE may send a probabilistic rank indicator (RI), signal-to-noise ratio (SNR), precoding matrix indicator (PMI), channel quality indicator (CQI) report (e.g., for data communication), reference signal time difference (RSTD) measurement, angle of arrival (AoA), angle of departure (AoD) reports (e.g., for positioning), or any combination thereof. While some examples have described a probabilistic estimation report transmitted from the UE 804 to the BS 802, the aspects described herein are also applicable to reports from the BS 802 to the UE 804. For example, a probabilistic estimation report 812 (e.g., probabilistic SRS measurement report) may be sent from the BS 802 to the UE 804. The UE may use the probabilistic estimate report to determine channel conditions, facilitating efficient communication.

Figure 9:
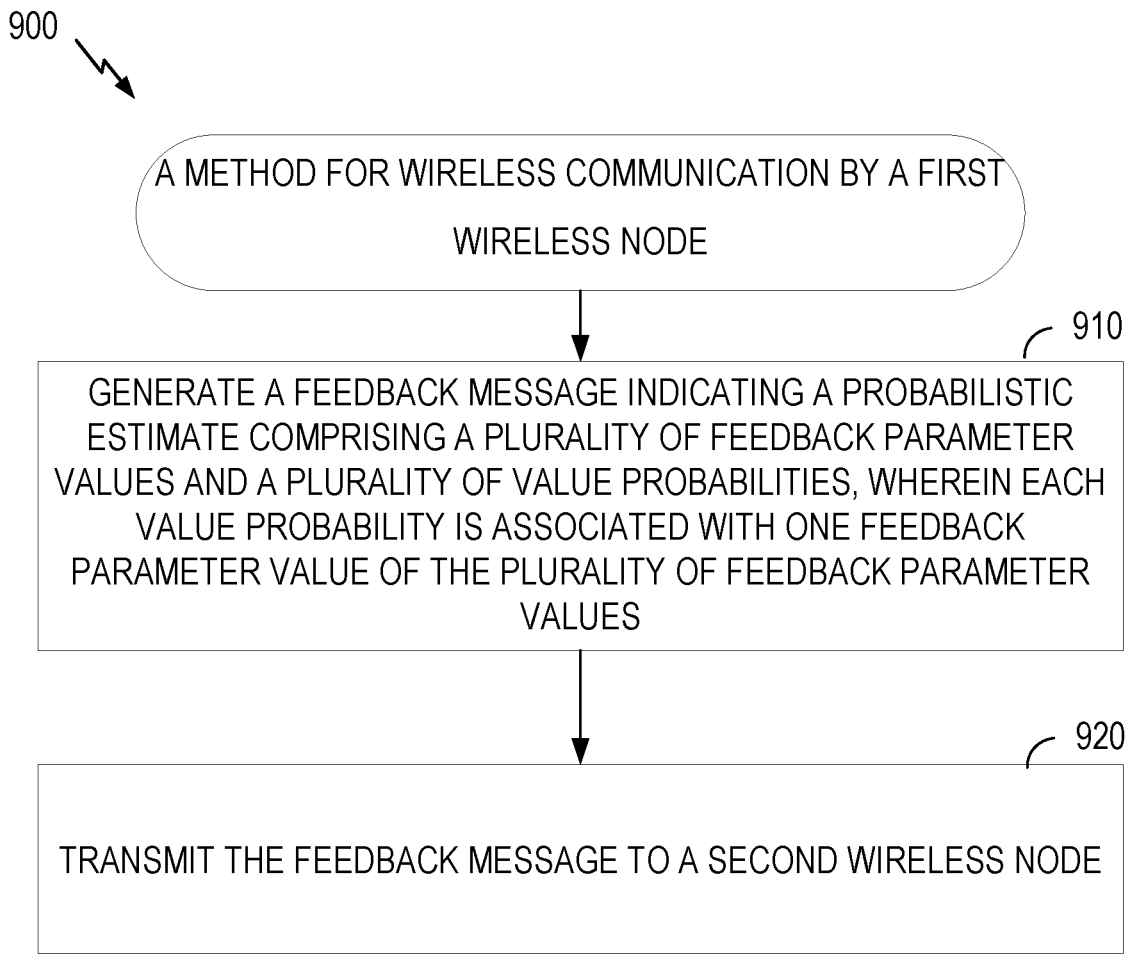
FIG. 9 is a flow diagram illustrating example operations for transmitting a feedback parameter, in accordance with certain aspects of the present disclosure.

FIG. 9 is a flow diagram illustrating example operations 900 for wireless communication, in accordance with certain aspects of the present disclosure. The operations 900 may be performed, for example, by a first wireless node such as a UE (e.g., a UE 104 in the wireless communication network 100 of FIG. 1) or any other child node.

Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280 or feedback component 281 of FIG. 2) obtaining and/or outputting signals.

The operations 900 begin, at block 910, with the first wireless node generating a feedback message (e.g., estimate report 810) indicating a probabilistic estimate having a plurality of feedback parameter values and a plurality of value probabilities. Each value probability may be associated with one feedback parameter value of the plurality of feedback parameter values.

The plurality of feedback parameter values and the plurality of value probabilities may be indicated using a probability distribution function (e.g., probability distribution function for SINR estimate 502 or 504 of FIG. 5). Indicating the probability distribution function may include indicating a mean and a variance associated with the probability distribution function (e.g., as shown in table 700 of FIG. 7). In some aspects, the feedback message may also include an indication of a duration during which the probabilistic estimate remains valid (e.g., validity duration as shown in table 700 of FIG. 7). In some aspects, the feedback message may also include an indication of the time and frequency resources in which measurements are collected on which the probabilistic estimate is based. For example, measurements for SINR may be collected between time=0 and time=1 sec. Those measurements may be used to generate the probabilistic estimate. The time and frequency resources may be indicated in the feedback message, as described herein.

At block 920, the first wireless node transmits the feedback message to a second wireless node. The plurality of feedback parameter values may include values for at least one of a received signal power, a signal-to-noise ratio (SNR), a signal-to-interference-plus-noise ratio (SINR), a rank indicator (RI), a pre-coding matrix indicator (PMI); a channel quality information (CQI), a reference signal time difference (RSTD); an angle of arrival (AoA), an angle of departure (AoD), or any combination thereof.

In some aspects, the probabilistic estimate is determined using a trained ML model. For example, the first wireless node may receive the trained ML model (e.g., estimation model 806 of FIG. 8) from the second wireless node.

In some aspects, the probabilistic estimate (e.g., probabilistic estimate 602 of FIG. 6) is associated with a signal strength on a channel. The feedback message may further indicate another probabilistic estimate (e.g., probabilistic estimate 604 of FIG. 6) associated with interference on the channel.

In some aspects, the feedback message may include a confidence level associated with the probabilistic estimate (e.g., probabilistic estimate 608 of FIG. 6 associated with a confidence value of 50%). In some cases, the feedback message may also include another probabilistic estimate and another confidence level associated with the other probabilistic estimate (e.g., probabilistic estimate 610 of FIG. 6 associated with a confidence value of 90%). In some aspects, the first wireless node may receive an indication of the confidence level (e.g., confidence value 807 of FIG. 8) to be used, and determine the probabilistic estimate based on the received indication.

In some aspects, the probabilistic estimate is one of multiple probabilistic estimates (e.g., as shown in table 700 of FIG. 7). The feedback message may indicate the multiple probabilistic estimates for multiple beam pairs to be used for communication between the first wireless node and the second wireless node.

In some aspects, the first wireless node may receive, from the second wireless node, a configuration (e.g., configuration 818 of FIG. 8) for communication. The configuration for communication may be based on the probabilistic estimate.

Figure 10:
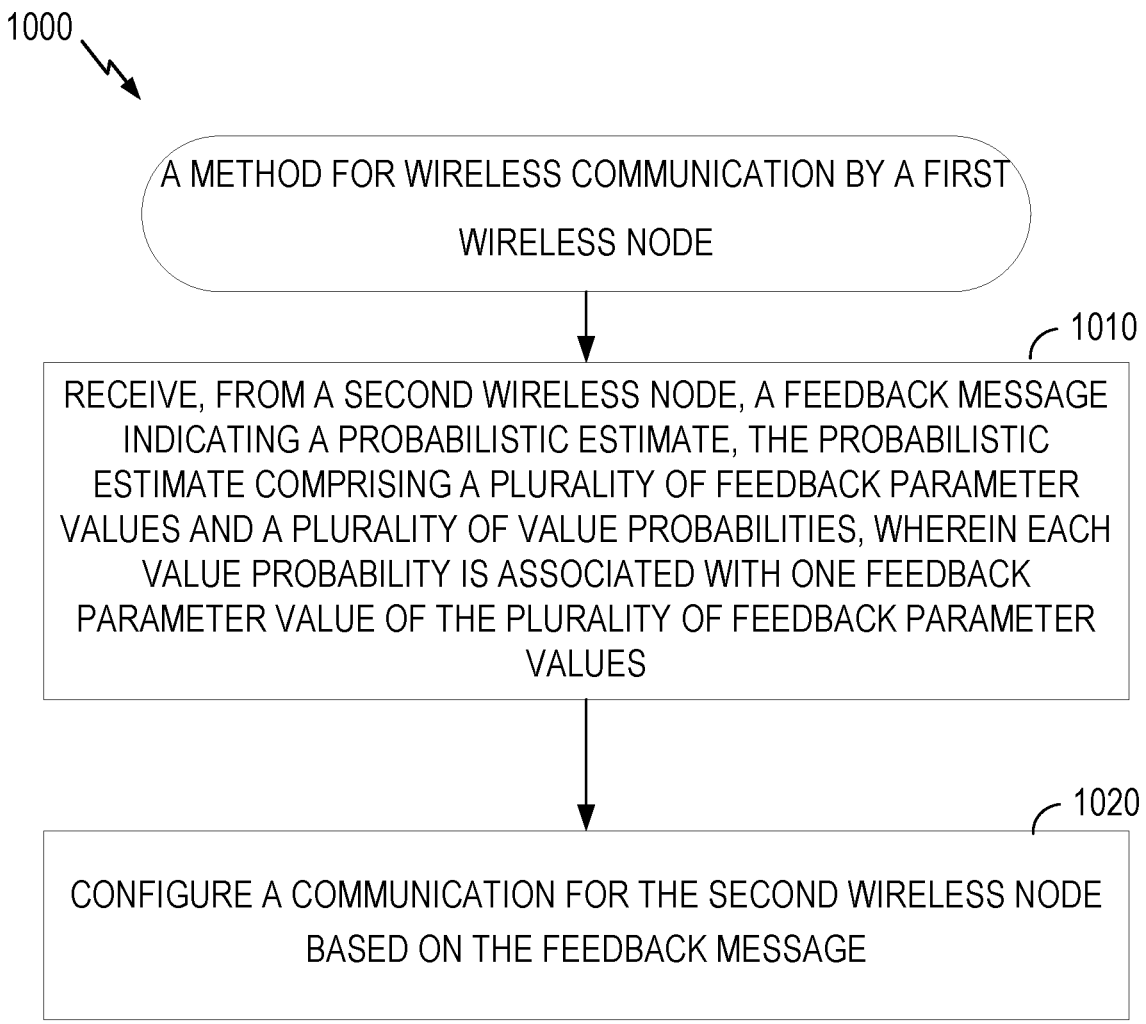
FIG. 10 is a flow diagram illustrating example operations for receiving a feedback parameter, in accordance with certain aspects of the present disclosure.

FIG. 10 is a flow diagram illustrating example operations 1000 for wireless communication, in accordance with certain aspects of the present disclosure. The operations 1000 may be performed, for example, by a first wireless node, such as a BS (e.g., such as the BS 102 in the wireless communication network 100 of FIG. 1) or any other parent node.

Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240 or feedback component 241 of FIG. 2) obtaining and/or outputting signals.

The operations 1000 begin, at block 1010, by the first wireless node receiving, from a second wireless node, a feedback message indicating a probabilistic estimate. The probabilistic estimate may include a plurality of feedback parameter values and a plurality of value probabilities. Each value probability may be associated with one feedback parameter value of the plurality of feedback parameter values.

In some aspects, the first wireless node may train a ML model to be used for determining the probabilistic estimate, and transmit the trained ML model to the second wireless node. In some aspects, the first wireless node may transmit an indication of a confidence level (e.g., confidence value 807 of FIG. 8) to be used for determining the probabilistic estimate.

In some aspects, the plurality of feedback parameter values and the plurality of value probabilities are indicated using a probability distribution function (e.g., probability distribution function for SINR estimate 502 or 504 of FIG. 5). The feedback message may indicate the probability distribution function by indicating a mean and a variance associated with the probability distribution function (e.g., as shown in table 700 of FIG. 7). In some aspects, the feedback message may also indicate a duration during which the probabilistic estimate remains valid (e.g., validity duration as shown in table 700 of FIG. 7). In some aspects, the feedback message may also include an indication of the time and frequency resources in which measurements are collected, and on which the probabilistic estimate is based.

In some aspects, the probabilistic estimate (e.g., probabilistic estimate 602 of FIG. 6) may be associated with signal strength on a channel. The feedback message may further indicate another probabilistic estimate (e.g., probabilistic estimate 604 of FIG. 6) associated with interference on the channel. The first wireless node may determine a SINR probabilistic estimate based on the probabilistic estimate associated with signal strength and the other probabilistic estimate associated with interference. The communication may be configured based on the SINR probabilistic estimate.

In some aspects, the feedback message may also include a confidence level associated with the probabilistic estimate (e.g., probabilistic estimate 608 associated with confidence value of 50%). The feedback message may also include another probabilistic estimate and another confidence level associated with the other probabilistic estimate (e.g., probabilistic estimate 610 associated with a confidence value of 90%).

In some aspects, the probabilistic estimate is one of multiple probabilistic estimates (e.g., as shown in table 700 of FIG. 7). The feedback message may indicate the multiple probabilistic estimates for multiple beam pairs to be used for communication by the second wireless node.

At block 1020, the first wireless node may configure a communication for the second wireless node based on the feedback message.

For example, the first wireless node may determine a modulation and coding scheme (MCS) for the communication based on the probabilistic estimate. Configuring the communication may include transmitting an indication of the MCS. In some aspects, configuring the communication may include selecting one or more UEs to be configured for the communication based on the probabilistic estimate. In some aspects, the first wireless node may coordinate with one or more other BSs to adjust a transmit power associated with the second wireless node, in response to the probabilistic estimate. In some aspects, the first wireless node may provide the probabilistic estimate to an ML model. The communication may be configured using the ML model based on the probabilistic estimate.

Example Wireless Communication Devices

Figure 11:
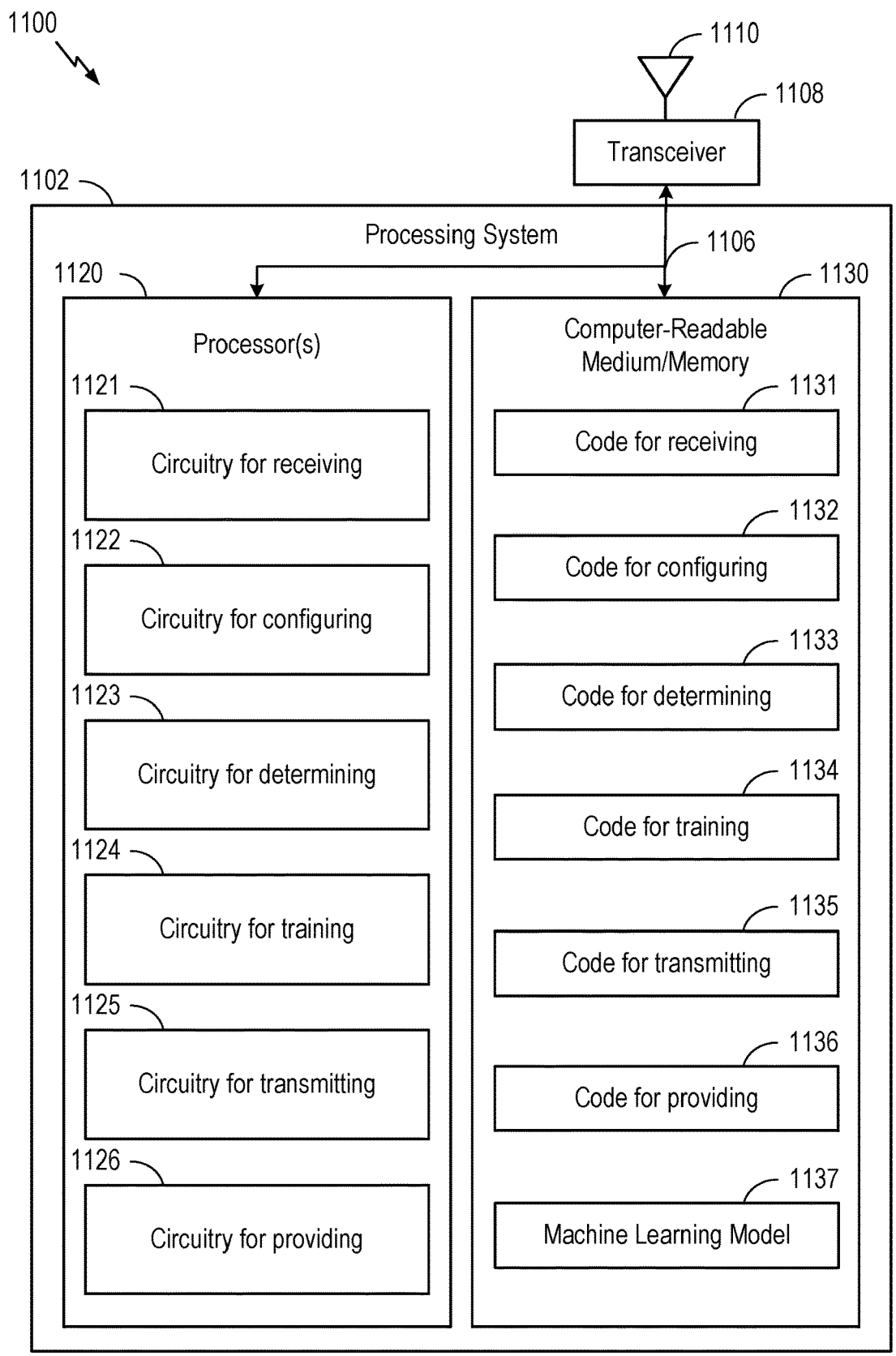
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 8 and 10. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 8 and 10, or other operations for performing the various techniques discussed herein for receive a probabilistic feedback parameter.

In the depicted example, computer-readable medium/memory 1130 stores code 1131 for receiving, code 1132 for configuring, code 1133 for determining, code 1134 for training, code 1135 for transmitting, code 1136 for providing, and a machine learning model 1137.

In the depicted example, the one or more processors 1120 include circuitry configured to implement the code stored in the computer-readable medium/memory 1130, including circuitry 1121 for receiving, circuitry 1122 for configuring, circuitry 1123 for determining, circuitry 1124 for training, circuitry 1125 for transmitting, and circuitry 1126 for providing.

Various components of communications device 1100 may provide means for performing the methods described herein, including with respect to FIGS. 8 and 10.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for receiving, means for configuring, means for determining, means for training, means for transmitting, and means for providing may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including a feedback component 241).

Notably, FIG. 11 is just use example, and many other examples and configurations of communication device 1100 are possible.

Figure 12:
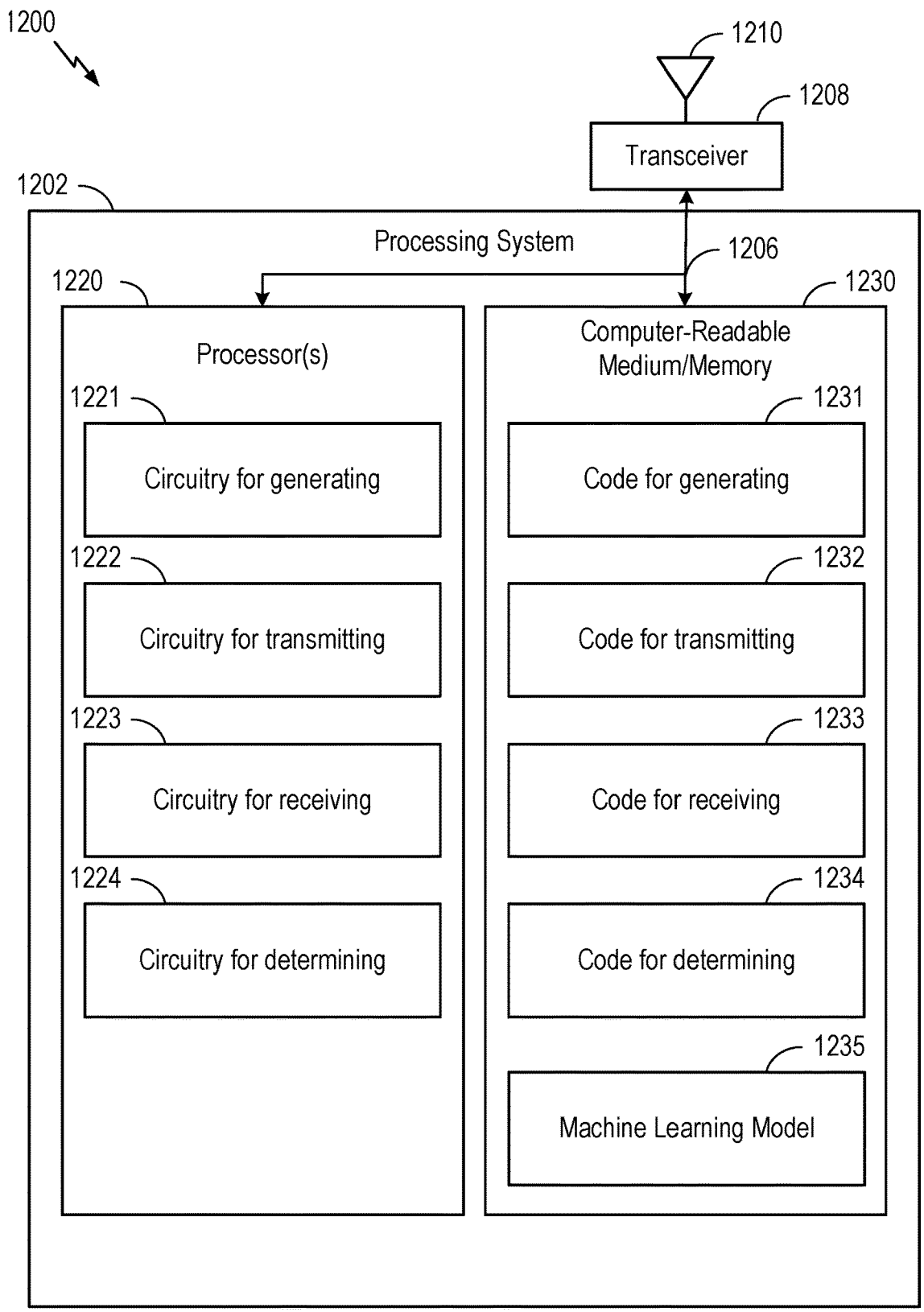
FIG. 12 depicts aspects of another example communications device.

FIG. 12 depicts an example communications device 1200 that includes various components operable, configured, or adapted to perform operations for the techniques disclosed herein, such as the operations depicted and described with respect to FIGS. 8 and 9. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 8 and 9, or other operations for performing the various techniques discussed herein for provide a probabilistic feedback parameter.

In the depicted example, computer-readable medium/memory 1230 stores code 1231 for generating, code 1232 for transmitting, code 1233 for receiving, code 1234 for determining; and machine learning model 1235.

In the depicted example, the one or more processors 1220 include circuitry configured to implement the code stored in the computer-readable medium/memory 1230, including circuitry 1221 for generating, circuitry 1222 for transmitting, circuitry 1223 for receiving, and circuitry 1224 for determining.

Various components of communications device 1200 may provide means for performing the methods described herein, including with respect to FIGS. 8 and 9.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for generating, means for transmitting, means for receiving, and means for determining may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including a feedback component 281).

Notably, FIG. 12 is just use example, and many other examples and configurations of communication device 1200 are possible.

Example Clauses

Implementation examples are described in the following numbered clauses:

Clause 1. A method for wireless communication by a first wireless node, comprising: generating a feedback message indicating a probabilistic estimate comprising a plurality of feedback parameter values and a plurality of value probabilities, wherein each value probability is associated with one feedback parameter value of the plurality of feedback parameter values; and transmitting the feedback message to a second wireless node.

Clause 2. The method of clause 1, wherein the plurality of feedback parameter values and the plurality of value probabilities are indicated using a probability distribution function.

Clause 3. The method of clause 2, wherein indicating the probability distribution function comprises indicating a mean and a variance associated with the probability distribution function.

Clause 4. The method of one of clauses 1-3, wherein the feedback message further includes at least one of: an indication of a duration during which the probabilistic estimate remains valid; or an indication of resources on which one or more measurements for generation of the probabilistic estimate were made.

Clause 5. The method of one of clauses 1-4, wherein the probabilistic estimate is associated with a signal strength on a channel, the feedback message further indicating another probabilistic estimate associated with interference on the channel.

Clause 6. The method of one of clauses 1-5, wherein the probabilistic estimate is determined using a trained machine learning (ML) model.

Clause 7. The method of clause 6, further comprising receiving the trained ML model from the second wireless node.

Clause 8. The method of one of clauses 1-7, wherein feedback message further includes a confidence level associated with the probabilistic estimate.

Clause 9. The method of clause 8, wherein the feedback message further comprises another probabilistic estimate and another confidence level associated with the other probabilistic estimate.

Clause 10. The method of one of clauses 8-9, further comprising: receiving an indication of the confidence level to be used; and determining the probabilistic estimate based on the received indication.

Clause 11. The method of one of clauses 1-10, wherein the probabilistic estimate is one of multiple probabilistic estimates, the feedback message indicating the multiple probabilistic estimates for multiple beam pairs to be used for communication between the first wireless node and the second wireless node.

Clause 12. The method of one of clauses 1-11, further comprising receiving, from the second wireless node, a configuration for communication, wherein the configuration for communication is based on the probabilistic estimate.

Clause 13. The method of one of clauses 1-12, wherein the plurality of feedback parameter values comprises values for at least one of: a received signal power; a signal to noise ratio (SNR); a signal-to-interference-plus-noise ratio (SINR); a rank indicator (RI); a pre-coding matrix indicator (PMI); a channel quality information (CQI); a reference signal time difference (RSTD); an angle of arrival (AoA); or an angle of departure (AoD).

Clause 14. A method for wireless communication by a first wireless node, comprising: receiving, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and configuring a communication for the second wireless node based on the feedback message.

Clause 15. The method of clause 14, wherein the plurality of feedback parameter values and the plurality of value probabilities are indicated using a probability distribution function.

Clause 16. The method of clause 15, wherein the feedback message indicates the probability distribution function by indicating a mean and a variance associated with the probability distribution function.

Clause 17. The method of one of clauses 14-16, wherein the feedback message further includes at least one of: an indication of a duration during which the probabilistic estimate remains valid; or an indication of resources on which one or more measurements for generation of the probabilistic estimate were made.

Clause 18. The method of one of clauses 14-17, wherein: the probabilistic estimate is associated with signal strength on a channel; the feedback message further indicating another probabilistic estimate associated with interference on the channel; and the method further comprising determining a signal-to-interference-plus-noise ratio (SINR) probabilistic estimate based on the probabilistic estimate associated with signal strength and the other probabilistic estimate associated with interference, the communication being configured based on the SINR probabilistic estimate.

Clause 19. The method of one of clauses 14-18, further comprising: training a machine learning (ML) model to be used for determining the probabilistic estimate; and transmitting the trained ML model to the second wireless node.

Clause 20. The method of one of clauses 14-19, wherein the feedback message further comprises a confidence level associated with the probabilistic estimate.

Clause 21. The method of clause 20, wherein the feedback message further comprises another probabilistic estimate and another confidence level associated with the other probabilistic estimate.

Clause 22. The method of one of clauses 14-21, further comprising transmitting an indication of a confidence level to be used for determining the probabilistic estimate.

Clause 23. The method of one of clauses 14-22, wherein the probabilistic estimate is one of multiple probabilistic estimates, the feedback message indicating the multiple probabilistic estimates for multiple beam pairs to be used for communication by the second wireless node.

Clause 24. The method of one of clauses 14-24, wherein the plurality of feedback parameter values comprises values for at least one of: a received signal power; a signal-to-noise ratio (SNR); a signal-to-interference-plus-noise ratio (SINR); a rank indicator (RI); a pre-coding matrix indicator (PMI); a channel quality information (CQI); a reference signal time difference (RSTD); an angle of arrival (AoA); or an angle of departure (AoD).

Clause 25. The method of one of clauses 14-24, further comprising determining a modulation and coding scheme (MCS) for the communication based on the probabilistic estimate, wherein configuring the communication comprises transmitting an indication of the MCS.

Clause 26. The method of one of clauses 14-25, wherein configuring the communication comprises selecting one or more UEs to be configured for the communication based on the probabilistic estimate.

Clause 27. The method of one of clauses 14-26, wherein: the first wireless node comprises a base station (BS); and the method further comprises, in response to the probabilistic estimate, coordinating with one or more other BSs to: adjust a transmit power associated with the second wireless node; or transmit a reference signal to be used by the second wireless node for performing an inter-cell interference measurement.

Clause 28. The method of one of clauses 14-27, further comprising providing the probabilistic estimate to an ML model, wherein the communication is configured using the ML model based on the probabilistic estimate.

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of providing a probabilistic feedback parameter in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first wireless node, comprising:
   generating a feedback message indicating a probabilistic estimate comprising a plurality of feedback parameter values and a plurality of value probabilities, wherein each value probability is associated with one feedback parameter value of the plurality of feedback parameter values; and
   transmitting the feedback message to a second wireless node.

2. An apparatus for wireless communication by a first wireless node, comprising:
   a memory comprising executable instructions, and
   one or more processors configured to execute the executable instructions and cause the apparatus to:
      generate a feedback message indicating a probabilistic estimate comprising a plurality of feedback parameter values and a plurality of value probabilities, wherein each value probability is associated with one feedback parameter value of the plurality of feedback parameter values, and
      transmit the feedback message to a second wireless node.

3. The apparatus of claim 2, wherein the plurality of feedback parameter values and the plurality of value probabilities are indicated using a probability distribution function.

4. The apparatus of claim 2, wherein the feedback message indicates the probability distribution function by indicating a mean and a variance associated with the probability distribution function.

5. The apparatus of claim 2, wherein the feedback message further includes at least one of:
   an indication of a duration during which the probabilistic estimate remains valid; or
   an indication of resources on which one or more measurements for generation of the probabilistic estimate were made.

6. The apparatus of claim 2, wherein the probabilistic estimate is associated with a signal strength on a channel, the feedback message further indicating another probabilistic estimate associated with interference on the channel.

7. The apparatus of claim 2, wherein the one or more processors are configured to execute the executable instructions and cause the apparatus to determine the probabilistic estimate using a trained machine learning (ML) model.

8. The apparatus of claim 7, wherein the one or more processors are configured to execute the executable instructions and cause the apparatus to receive the trained ML model from the second wireless node.

9. The apparatus of claim 2, wherein the feedback message further includes a confidence level associated with the probabilistic estimate.

10. The apparatus of claim 9, wherein the feedback message further comprises another probabilistic estimate and another confidence level associated with the other probabilistic estimate.

11. The apparatus of claim 9, wherein the one or more processors are configured to execute the executable instructions and cause the apparatus to:
    receive an indication of the confidence level to be used; and
    determine the probabilistic estimate based on the received indication.

12. The apparatus of claim 2, wherein the probabilistic estimate is one of multiple probabilistic estimates, the feedback message indicating the multiple probabilistic estimates for multiple beam pairs to be used for communication between the first wireless node and the second wireless node.

13. The apparatus of 2, wherein the one or more processors are configured to execute the executable instructions and cause the apparatus to receive, from the second wireless node, a configuration for communication, wherein the configuration for communication is based on the probabilistic estimate.

14. The apparatus of claim 2, wherein the plurality of feedback parameter values comprises values for at least one of:
    a received signal power;
    a signal to noise ratio (SNR);
    a signal-to-interference-plus-noise ratio (SINR);
    a rank indicator (RI);
    a pre-coding matrix indicator (PMI);
    a channel quality information (CQI);
    a reference signal time difference (RSTD);
    an angle of arrival (AoA); or
    an angle of departure (AoD).

15. A method for wireless communication by a first wireless node, comprising:
    receiving, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and
    configuring a communication for the second wireless node based on the feedback message.

16. An apparatus for wireless communication by a first wireless node, comprising:
    a memory comprising executable instructions; and
    one or more processors configured to execute the executable instructions and cause the apparatus to:
    receive, from a second wireless node, a feedback message indicating a probabilistic estimate, the probabilistic estimate comprising a plurality of feedback parameter values and a plurality of value probabilities, wherein each value probability is associated with one feedback parameter value of the plurality of feedback parameter values; and
    configure a communication for the second wireless node based on the feedback message.

17. The apparatus of claim 16, wherein the plurality of feedback parameter values and the plurality of value probabilities are indicated using a probability distribution function.

18. The apparatus of claim 17, wherein the feedback message indicates the probability distribution function by indicating a mean and a variance associated with the probability distribution function.

19. The apparatus of claim 16, wherein the feedback message further includes at least one of:
an indication of a duration during which the probabilistic estimate remains valid; or
an indication of resources on which one or more measurements for generation of the probabilistic estimate were made.

20. The apparatus of claim 16, wherein:
the probabilistic estimate is associated with signal strength on a channel;
the feedback message further indicates another probabilistic estimate associated with interference on the channel; and
the one or more processors are further configured to execute the executable instructions and cause the apparatus to determine a signal-to-interference-plus-noise ratio (SINR) probabilistic estimate based on the probabilistic estimate associated with signal strength and the other probabilistic estimate associated with interference, the one or more processors configured to execute the executable instructions and cause the apparatus to configure the communication based on the SINR probabilistic estimate.

21. The method apparatus of claim 16, wherein the one or more processors are further configured to execute the executable instructions and cause the apparatus to:
train a machine learning (ML) model to be used for determining the probabilistic estimate; and
transmit the trained ML model to the second wireless node.

22. The apparatus of claim 16, wherein the feedback message further comprises a confidence level associated with the probabilistic estimate.

23. The apparatus of claim 22, wherein the feedback message further comprises another probabilistic estimate and another confidence level associated with the other probabilistic estimate.

24. The apparatus of claim 16, wherein the one or more processors are further configured to execute the executable instructions and cause the apparatus to transmit an indication of a confidence level to be used for determining the probabilistic estimate.

25. The apparatus of claim 16, wherein the probabilistic estimate is one of multiple probabilistic estimates, the feedback message indicating the multiple probabilistic estimates for multiple beam pairs to be used for communication by the second wireless node.

26. The apparatus of claim 16, wherein the plurality of feedback parameter values comprises values for at least one of:
a received signal power;
a signal-to-noise ratio (SNR);
a signal-to-interference-plus-noise ratio (SINR);
a rank indicator (RI);
a pre-coding matrix indicator (PMI);
a channel quality information (CQI);
a reference signal time difference (RSTD);
an angle of arrival (AoA); or
an angle of departure (AoD).

27. The apparatus of claim 16, wherein the one or more processors are further configured to execute the executable instructions and cause the apparatus to determine a modulation and coding scheme (MCS) for the communication based on the probabilistic estimate, wherein the one or more processors are configured to execute the executable instructions and cause the apparatus to the transmit an indication of the MCS.

28. The apparatus of claim 16, wherein the one or more processors are configured to execute the executable instructions and cause the apparatus to select one or more UEs to be configured for the communication based on the probabilistic estimate.

29. The apparatus of claim 16, wherein:
the first wireless node comprises a base station (BS); and
the one or more processors are configured to execute the executable instructions and cause the apparatus to, in response to the probabilistic estimate, coordinate with one or more other BSs to:
adjust a transmit power associated with the second wireless node; or
transmit a reference signal to be used by the second wireless node for performing an inter-cell interference measurement.

30. The apparatus of claim 16, wherein the one or more processors are further configured to execute the executable instructions and cause the apparatus to provide the probabilistic estimate to an ML model, wherein the one or more processors are further configured to execute the executable instructions and cause the apparatus to configure the communication using the ML model based on the probabilistic estimate.

* * * * *